3,503,946
PROCESS FOR THE MANUFACTURE OF CATIONIC POLYACRYLAMIDE
Clyde Stephen Scanley and Hans Peter Panzer, Stamford, Conn., assignors to American Cyanamid Company, Stamford, Conn., a corporation of Maine
No Drawing. Filed July 14, 1967, Ser. No. 653,348
Int. Cl. C08f 3/90; C10m 1/36, 3/30
U.S. Cl. 260—89.7         9 Claims

---

ABSTRACT OF THE DISCLOSURE

Polyacrylamide is heated with a water-soluble polyamine having not more than one amide-reactive substituent at least until the polyacrylamide has become cationic. The resulting cationic polyacrylamide may be purified of any unreacted amine and solvent present, and is useful as flocculating agent for suspended matter in aqueous suspension. It may be quaternized to effect still further improvement.

---

The present invention relates to a process for improving the effectiveness of polyacrylamide as a flocculating agent.

It is known that polyacrylamide is effective as a flocculating agent for finely divided solids in aqueous suspension, for example, the suspended solids in sewage, paper mill white water and the effluent from mining operations. The national interest now requires that larger volumes of contaminated water be purified and accordingly efforts have been made to improve polyacrylamide for this purpose.

The discovery has now been made that the flocculating efficiency of polyacrylamide is greatly improved when polyacrylamide is heated with a water-soluble polyamine having not more than one amide-reactive amino substituent, at a reaction temperature, at least until the polyacrylamide has become cationic. Preferably, the polyacrylamide is reacted with sufficient of the polyamine to render it strongly cationic.

The product of the reaction may be used in crude state, without purification. If desired, however, any of the polyamine which has not undergone reaction with the polyacrylamide, and any organic solvent present may be removed, as is more particularly hereinafter described.

We have further found that the process may be extended with additional good results by heating the product with a quaternizing agent. A polyacrylamide containing quaternary ammonium substituents is obtained which possesses stronger cationic properties. These derivatives, when water-soluble, are consequently more effective as flocculating agents and, when water-insoluble, are useful as detergents in lubricating oil.

Polyacrylamide is rendered cationic by the process of the present invention regardless of its molecular weight. It is an important advantage of the invention that polymers having molecular weights in excess of 1,000,000 are easily rendered strongly cationic without significantly decreasing their molecular weight or water-solubility.

In general, according to the present invention, polyacrylamide is mixed with the desired amount of the water-soluble polyamine, and the mixture is heated at a reaction temperature about 80° C.–175° C. until the polyacrylamide has become cationic. Preferably, an inert mutual solvent is present as this facilitates the reaction and eliminates need for an excess amount of the amine. At least $1/20$ mol of the polyamine is added per —$CONH_2$ substituent of the polyacrylamide, this being about the least amount which, when reacted, renders the polyacrylamide sufficiently cationic. A larger amount of polyamine may be employed and, if desired, a great excess may be present. In practice, we prefer not to use more than 2 mols which is regarded as the practical maximum.

Any desired amount of the polyamine can be reacted, and it is readily feasible to convert 100% of the —$CONH_2$ substituents to cationic form. The percentage of the —$CONH_2$ substituents which are converted to cationic form depends in each instance on the cationic strength which it is desired that the product possess, and this in turn depends on the cationic demand of the material to be flocculated.

The amount of solvent present in any instance will depend upon the molecular weight of the polyacrylamide and the molecular weight of the amine. Sufficient should be used that all of the polyacrylamide is in dissolved (gel) state. In such state it is a rubbery viscous mass. Any of the common inert solvents for polyacrylamide can be used; these solvents are like solvents for water-soluble polyamines. Ethylene glycol, glycerol, glucose, sorbitol and water are preferred because of their cheapness, lack of toxicity and ease with which they can be removed. Of these, ethylene glycol has the lowest viscosity and hence is most convenient to use.

Any water-soluble polyamine which contains not more than one amide-reactive amino substituent (i.e., not more than one primary or secondary amino substituent) is suitable for use in the process of the present invention. More than one amide-reactive amino substituent, we have found, causes a cross-linking reaction to occur which first decreases the effectiveness of the polymer as a flocculant and then renders the polymer water-insoluble and so useless for that purpose. Suitable polyamines of the group mentioned include 2-(dimethylamino)ethylamine, 2-(diethylamino)ethylamine, 2-(butylmethylamino)ethylamine, 3-dimethylaminoethyl)morpholine, 4-(2-aminoethyl)pyridine, N-(2-aminoethyl)aniline and the corresponding propyl, isopropyl and butyl analogs of the aforementioned dialkylaminoethylamines. We have found 3-(dimethylamino)propylamine and 3-(diethylamino) propylamine to be especially suitable because these amines are easily soluble in water and methanol and yet have high boiling points so that they permit the reaction to be carried out in simple equipment at a higher temperature than would otherwise be the case.

After reaction, any residual polyamine may be removed. Low-boiling polyamines may be removed by distillation; otherwise the amine may be removed by elutriating the reaction mixture with a material which is a solvent for the amine but a substantial non-solvent for the polymer. The lower alkanols are suitable for this purpose. Methanol is preferred because of its excellent solvent capacity for amines and the readiness with which it can be volatilized, thereby permitting the unreacted amine to be recovered in pure form suitable for reuse. Methanol has the added advantage of elutriating at the same time any water or any of the preferred solvents which may be present. Use of anhydrous methanol permits production of the cationic polyacrylamide in anhydrous friable form.

Further improvement of the polyacrylamide is accomplished as desired by subjecting the reaction product described above to reaction with a quaternizing agent. The reaction proceeds easily at low temperature, while the polymer and the quaternizing agent are dissolved in aqueous or organic mutual solvent. Any of the agents which are commonly used for quaternizing tertiary amine atoms are suitable for improving the polymer produced as has been described; among these are methyl chloride, ethyl chloride, chloroethanol, ethyl chloroacetate and dimethyl sulfate. Many additional compounds suitable for the purpose are known to those skilled in the art. The water-soluble quaternized products are useful as flocculating agents, as described herein. Products which are water-insoluble are useful as dispersants in automotive crankcase oils.

The invention will be further described by reference to the examples. These examples constitute embodiments of the invention and are not to be construed as limitations thereon.

EXAMPLE 1

The following illustrates a preferred method for the preparation of a polymer of the present invention.

Into a sigma kneader running at slow speed is charged first 800 g. of ethylene glycol, then 200 g. of polyacrylamide having a molecular weight of 4,000,000, and finally 115 g. of 3-(dimethylamino)propylamine (0.4 mol per acrylamide linkage in the polyacrylamide). The reaction mixture is heated to 84° C. and then slowly heated to 120° C. over 100 minutes with continued kneading. The reaction mixture is then cooled to room temperature; it is a tough, rubbery water-soluble gel having an alkaline pH.

The product dissolves readily in water at pH 7. It shows effectiveness as flocculant for sewage sludge, for raw sewage, and for ilmenite ore slimes. It is rapidly and substantively adsorbed by cellulose papermaking fibers, and 0.2% based on the dry weight of the fibers renders the fibers strongly cationic. Paper made from the thus-treated fibers possesses improved dry strength.

EXAMPLE 2

The following illustrates the preparation of a cationic polyacrylamide according to the present invention with recovery of the solvent and excess (unreacted) amine.

A reaction mixture of 120 g. (1.7 mol) of polyacrylamide of 4,000,000 molecular weight, 700 ml. (5.6 mol) of 3-(dimethylamino)propylamine and 700 ml. of ethylene glycol in a reaction vessel fitted with water-cooled condenser is heated to 85° C. and is then heated to 140° C. over a period of 100 minutes. The mixture is then heated to 170° C. and is maintained at that temperature for 40 minutes which boils off most of the unreacted amine, which is recovered from the condenser. The reaction mixture is cooled, washed three times in methanol thereby elutriating substantially all of the glycol and any residual amine, and is then heated to drive off residual methanol. The product is the cationic polymer in substantially pure condition; it is a friable gel and is pulverized to a free-flowing powder. Analysis shows that approximately 40% of the amide substituents of the starting polymer have been converted into dimethylaminopropylamido substituents.

EXAMPLE 3

The following illustrates the process of the present invention performed by use of water as solvent.

A mixture of 45 g. of polyacrylamide of 4,000,000 molecular weight, 32.4 g. of 3-(dimethylamino)propylamine (0.5 mol per acrylamide linkage in the polymer) and 223 g. of water is allowed to equilibrate at room temperature for 2.5 hours. A sample of the resulting gel is then heated as a 3-mm. deep layer in a glass dish in an oven at 110° C. for 50 minutes. The product is a friable gel which is ground to a free-flowing powder. The powder readily dissolves to 0.1% solids in water at pH 4.2. The polymer is strongly cationic.

EXAMPLE 4

The following illustrates the process of the present invention wherein water is the solvent, and the reaction is performed at about neutral pH.

Into a sigma mixer operating at slow speed is charged 600 g. of an aqueous polyacrylamide gel containing 13% polyacrylamide (molecular weight 4,000,000) by weight, 75 g. of 3-(dimethylamino)propylamine (0.615 mol per acrylamide linkage in the polymer), 275 ml. of water, and 120.5 ml. of concentrated hydrochloric acid. The total volume of the reaction mixture is 425 ml., and its pH is 8.0.

The mixture is removed from the mixer and is heated at approximately 100° C. for 50 minutes as a layer 3 mm. thick in a pan. The product is friable and readily pulverized to a free-flowing powder which dissolves rapidly in water, forming a solution of a strongly cationic polymer.

EXAMPLE 5

The procedure of Example 3 is repeated except that the polyacrylamide used has a molecular weight of 12,000,000, the molar ratio of the amide substituents of the polyacrylamide to the polyamine is 1:0.74, and the reaction mixture is heated at 110° C. for 1.5 hours.

EXAMPLE 6

The procedure of Example 1 is repeated except that 146 g. of 3-(dimethylaminoethyl)morpholine is employed as the polyamine. A strongly cationic polymer is obtained.

EXAMPLE 7

The procedure of Example 1 is repeated except that 106 g. of 4-(2-aminoethyl)pyridine is employed as the polyamine. A strongly cationic polymer is obtained.

EXAMPLE 8

The procedure of Example 1 is repeated except that 154 g. of N-(2-aminoethyl)aniline is employed as the polyamine. A strongly cationic polymer is obtained.

EXAMPLE 9

The following illustrates the preparation of a quaternary derivative of a condensation product of polyacrylamide with a polyamine, according to the present invention.

A 10.7-g. sample of the powdered product of Example 2 is dissolved in 150 g. of ethylene glycol in a closed Brabender mixer, and 125 g. of ethyl iodide (0.8 mol) is added. The composition is mixed at 50° C. for four hours. The resulting polymer is extruded into methanol, extracted four times with 50-ml. portions of hot methanol, and dried. Titration indicates that substantially all of the tertiary nitrogen atoms in the starting polymer have been quaernized.

A sample is readily pulverized. The powder dissolves readily in warm water, forming a solution of a strongly cationic polymer.

EXAMPLE 10

The procedure of Example 9 is repeated, except that glycerol is used in the solvent and the ethyl iodide is replaced by 11.4 g. (0.8 mol) of methyl iodide introduced under pressure.

EXAMPLE 11

The procedure of Example 9 is repeated except that the ethyl iodide is replaced by 13.7 g. (0.8 mol) of benzyl bromide.

EXAMPLE 12

The procedure of Example 9 is repeated, except that the ethyl iodide is replaced by 5.5 g. (0.87 mol) of dimethyl sulfate.

EXAMPLE 13

To a 300-ml. sample of typical digested sewage sludge containing 5% sewage solids by weight and having a pH of 6.8 is added with gentle stirring 8 ml. of a 0.1% by weight solution in water of the cationic polyacrylamide product of Example 3. The suspension is immediately poured on a Büchner funnel operating under vacuum, and the number of seconds are noted which are required for 50 and 100 ml. of the liquid phase of the suspension to pass through the filter. The same test is given as control to a sample of the sewage to which no polymer has been added. Results are as follows.

| Run | Polymer Added [1] | Time to Collect | |
|---|---|---|---|
| | | 50 ml. | 100 ml. |
| 1 (control) | None | Less than 5 ml. is collected in 5 minutes. | |
| 2 | 8 ml | 5 sec | 19 sec. |

[1] Ml. of 0.1% solution.

The results show that the polymer is a very effective flocculant for the solids present in sewage.

EXAMPLE 14

1000 ml. of unflocculated raw sewage having a pH of 7.2 and a suspended solids content of 150 p.p.m. by weight is stirred at 100 r.p.m. To this is added 1 cc. of a 0.1% by weight solution in water of the cationic polyacrylamide product of Example 3 (PAM; sufficient to provide 1 p.p.m. of the polyacrylamide on the weight of the 1000 ml. of sewage). After 5 seconds, stirring is slowed to 5 r.p.m. to permit observation of flocculation.

The process is repeated on a fresh sample of the sewage with 2 cc. of the polymer solution and is repeated again, and then again, each time with a fresh sample of the sewage.

Results are as follows:

| No. | Total Cationic PAM Added, p.p.m. | Flocculation Effected | |
|---|---|---|---|
| | | Extent | Settling Speed of Flocs |
| 1 | None | None | |
| 2 | 1 | do | |
| 3 | 3 | do | |
| 4 | 6 | Complete | Slow. |
| 5 | 9 | do | Fast. |

EXAMPLE 15

The procedure of Example 7 is repeated with the sewage sample adjusted to pH 8 and using 0.1% solutions of the polyacrylamides of Examples 9–11.

The quaternary polymers appear to cause flocculation at lower addition levels than the nonquaternized cationic polyacrylamides.

EXAMPLE 16

The procedure of Example 2 is repeated using (a) polyacrylamide and (b) polymethacrylamide, each having a molecular weight of about 500,000. Water-soluble cationic products are obtained which possess good wet-strengthening properties for paper. The polymers are added to beater pulp at 0.6% consistency and pH 7.5 in amount sufficient to provide 0.3% of polymer on the dry weight of the fibers. The strengthening effect of the polymer is developed by drying the wet water-laid web on a drum drier having a drum temperature of 230° F.

EXAMPLE 17

The procedure of Example 2 is repeated except that the reaction mixture is maintained at 140° C. for 18 hours. Titration of the product shows that the reaction has gone to approximately 100% completion.

EXAMPLE 18

71 g. of polyacrylamide having a molecular weight of 4,000,000, 300 g. of sorbitol, and 92 g. of N,N,N¹-trimethylethylenediamine are charged into flask provided with stirrer and condenser. The mixture is slowly heated to 125° C. to avoid local overheating, and is maintained at 125° C. overnight. The product is washed three times with methanol, ground, and dissolved in water. The resulting solution is a very satisfactory flocculant.

EXAMPLE 19

The following illustrates the process of the present invention performed by the use of excess amine as solvent.

The procedure of Example 1 is repeated except that ethylene glycol is omitted, and 800 g. of 2-(dimethylamino) ethylamine are used as the amine component, and the reaction mixture is elutriated with methanol to remove unreacted amine.

A similar product is obtained.

We claim:

1. A process which consisting essentially of heating at a reaction temperature up to about 170° C. a mixture of a water-soluble polyacrylamide, and a water-soluble polyamine having not more than one amide-reactive amino substituent, the amount of said polyamine being between $\frac{1}{20}$ and 2 mols per $-CONH_2$ substituent of said polyacrylamide, at least until said polyacrylamide has become cationic by reaction of $-CONH_2$ substituents of said polyacrylamide with said polyamine.

2. A process according to claim 1 wherein the polyacrylamide has a molecular weight in excess of 1,000,000.

3. A process according to claim 1 wherein substantially all of the $-CONH_2$ substituents of said polyacrylamide are reacted with said polyamine.

4. A process according to claim 1 wherein the amine is a (dialkylamino)alkylamine.

5. A process according to claim 1 wherein the reaction mixture contains an inert solvent for said polyacrylamide and said polyamine.

6. A process according to claim 5 wherein the solvent is ethylene glycol.

7. A process according to claim 5 wherein the solvent is water.

8. A process which comprises reacting a water-soluble polyacrylamide with a water-soluble polyamine according to claim 1, and then washing the product of the reaction with methanol to elutriate any unreacted polyamine therefrom.

9. A process which comprises reacting a water-soluble polyacrylamide with a water-soluble polyamine according to claim 1, and then reacting the resulting cationic polyacrylamide with a quaternizing agent.

References Cited

FOREIGN PATENTS 211,734   1/1956   Australia.

JOSEPH L. SCHOFER, Primary Examiner

W. F. HAMROCK, Assistant Examiner

U.S. Cl. X.R.

210—54; 252—51.5